United States Patent [19]
Erikson et al.

[11] Patent Number: 5,937,702
[45] Date of Patent: Aug. 17, 1999

[54] SPRING BIAS WEDGE IN REINFORCING RAIL

[75] Inventors: Kenneth W. Erikson, Hollis; Keith Erikson, Amherst, both of N.H.

[73] Assignee: Kerk Motion Products, Inc., Hollis, N.H.

[21] Appl. No.: 09/173,939

[22] Filed: Oct. 16, 1998

Related U.S. Application Data

[63] Continuation-in-part of application No. 08/842,849, Apr. 17, 1998.

[30] Foreign Application Priority Data

Apr. 14, 1998 [WO] WIPO ............... PCT/US98/07853

[51] Int. Cl.$^6$ .................................................. F16H 55/17
[52] U.S. Cl. ................................... 74/459; 74/89.15
[58] Field of Search ..................... 74/89.15, 459, 74/424.8 R

[56] References Cited

U.S. PATENT DOCUMENTS

| | | | |
|---|---|---|---|
| 4,131,031 | 12/1978 | Erikson et al. ........................ | 74/441 |
| 4,566,345 | 1/1986 | Erikson et al. ........................ | 74/89.15 |
| 5,079,963 | 1/1992 | Yamamoto et al. .................... | 74/89.15 |
| 5,689,997 | 11/1997 | Schaller ................................. | 74/335 |

FOREIGN PATENT DOCUMENTS 0 559 441 A1 3/1993 European Pat. Off. .
0 577 390 A2 6/1993 European Pat. Off. .

Primary Examiner—John A. Jeffery
Assistant Examiner—David Fenstermacher
Attorney, Agent, or Firm—Hamilton, Brook, Smith and Reynolds, P.C.

[57] ABSTRACT

The reinforced lead screw has a hollow, elongated reinforcing rail surrounding a lead screw and a nut-bearing movable along the reinforcing rail. The nut-bearing has a portion projecting through a slot in the reinforcing rail and includes threads to engage the threads on the lead screw such that when the lead screw is rotated in either direction, the nut will translate along the rail. A wedge is slidably mounted on the nut-bearing and is biased towards a central axis. The wedge has a pair of bearing surfaces which engage surfaces of the reinforcing rail to restrict rotation of the nut-bearing. The rail may be provided with a sleeve-bearing which, in combination with the rail, serves not only as a guide for movement of the nut but lateral support for the lead screw.

20 Claims, 4 Drawing Sheets

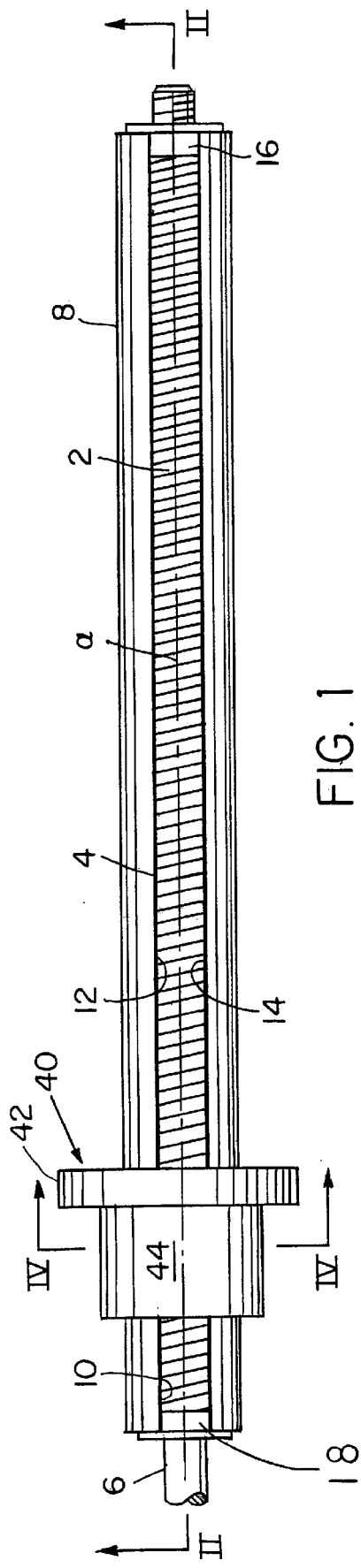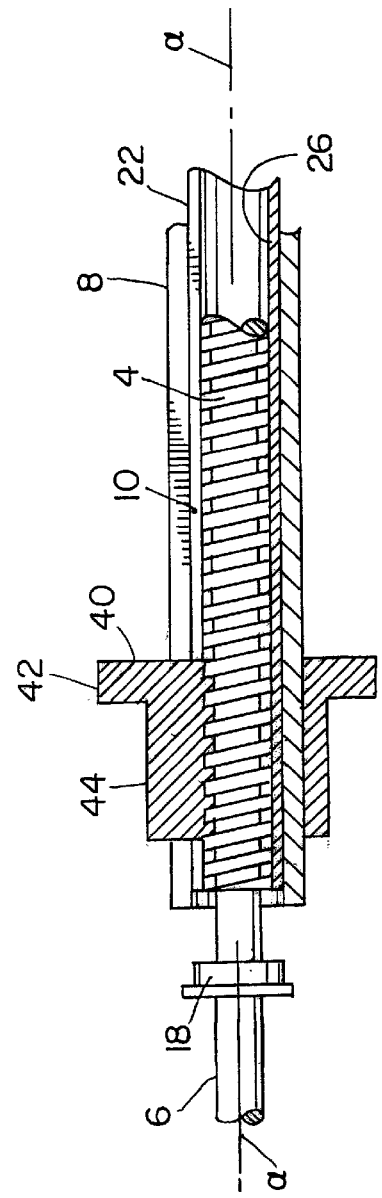
FIG. 1
FIG. 2

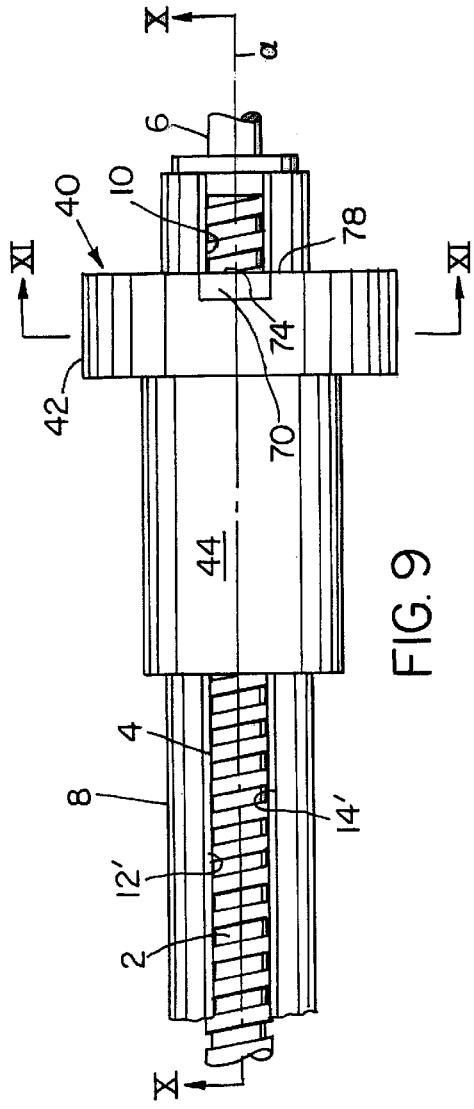
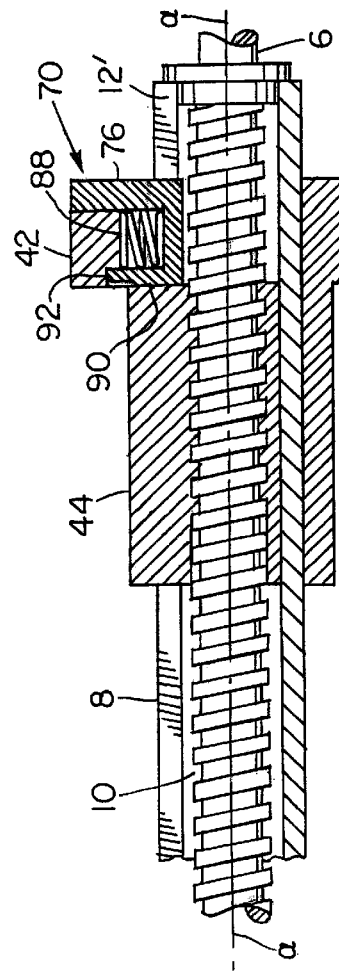
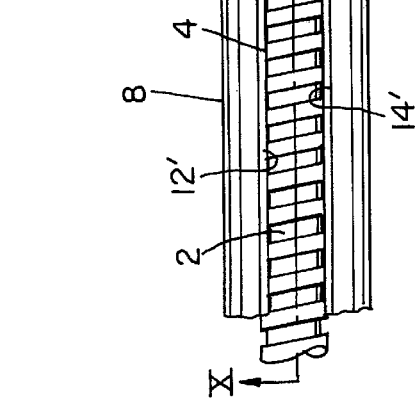
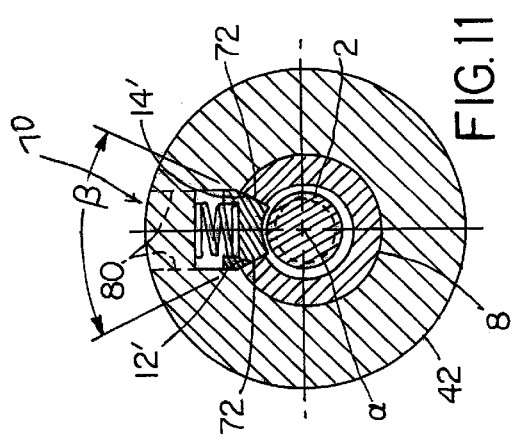
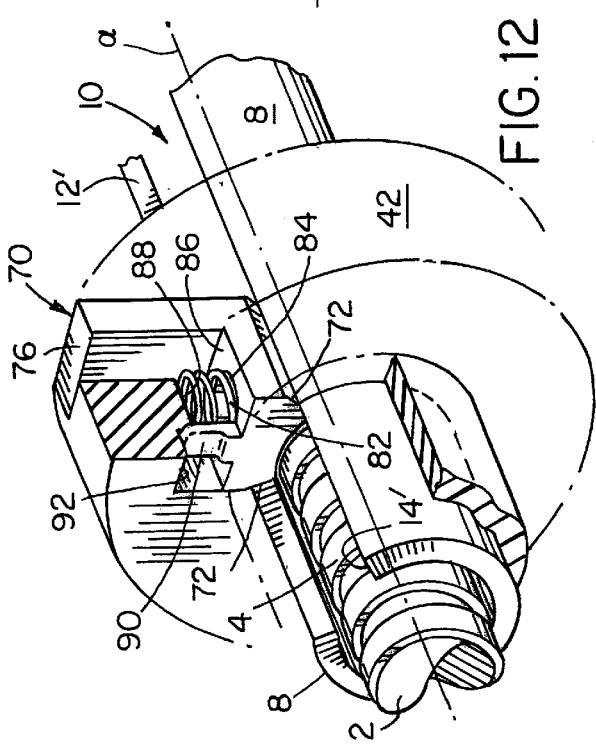
FIG. 9
FIG. 10
FIG. 11
FIG. 12

SPRING BIAS WEDGE IN REINFORCING RAIL

RELATED APPLICATIONS

This application is a Continuation-In-Part of U.S. application No. 08/842,849 filed Apr. 17, 1997, which corresponds to PCT Application No. PCT/US98/07853 filed Apr. 14, 1998, the entire teachings of which are incorporated herein by reference.

BACKGROUND OF THE INVENTION

In U.S. Pat. No. 4,566,345, which issued Jan. 26, 1986, the present inventors disclosed a carrier for mounting a tool for reciprocating motion along a pair of spaced, parallel guide rails. The carrier is reciprocated by a rotating lead screw extending lengthwise between and parallel to the guide rails and engaging an internally threaded nut in the carrier. The nut may be an anti-backlash nut. With the lead screw located between the rails, there are bearing supports extending laterally from the carrier, each mounting a bearing which slides on a guide rail much in the manner of outrigger pontoons.

The rails serve a number of purposes. They create a low-friction guideway for the carrier to ride on but, more importantly, they create an anti-rotation mechanism for the carriage. If there were no guide rails and the carrier were mounted on the lead screw only, the carrier probably would not reciprocate. This is because the mass of the carrier would create high frictional resistance between its threaded nut and the lead screw such that the carrier would rotate with the lead screw rather than traversing it. Secondly, again, if there were no guide rails and if the lead screw were oriented in a horizontal direction, the flexure of the lead screw, created by the weight of the carrier and the tool that it mounts, would cause the carrier to bind on the lead screw and/or cause the tool that it mounts to disengage from its workpiece.

Yet another problem can exist. Tools mounted on the carrier are normally offset from the central axis of the lead screw. In addition, the tools are mounted on posts in a cantilevered position relative to the carrier. Normal drag of the tool relative to its workpiece creates a torque which is imparted through the tool post to the carrier and, hence, to the supports riding on the rails which carry the bearings. This can cause unnecessary drag, monkey-biting, or can conceivably result in the lead screw's driving motor to stall out.

Another shortcoming in certain applications where space is limited is the size of the mechanism Two guide rails spaced laterally of a lead screw creates a drive mechanism which is spread out, generally horizontally, and, in some machine operations, there is not sufficient space to do this. In addition, it is difficult to obtain initial alignment of the screw and two parallel rails.

It is to the solution of these problems that the present invention is directed.

SUMMARY OF THE INVENTION

The invention resides in a reinforced lead screw assembly which includes a threaded lead screw rotatable about a central axis by a reversible motor. Surrounding the lead screw is a rigid, hollow, elongated reinforcing rail which extends lengthwise end to end of the screw. A nut-bearing is movable along the reinforcing rail and is driven by the screw. There is a slot in the reinforcing rail which extends lengthwise and parallel to the central axis of the lead screw. A projection or tongue on the nut extends in a radial direction through the slot in the reinforcing rail. The tongue or projection is engagable with the walls of the slot to prevent rotation of the nut-bearing relative to the rail. The tongue or projection mounts threads which are engagable with the threads of the lead screw. Consequently, when the lead screw is rotated in either direction, the nut will translate along the length of the screw.

A sleeve bearing is insertable in the reinforcing rail, in a preferred embodiment, which is made of low-friction, plastic material and engages the threads of the lead screw to offer lateral support in cooperation with the reinforcing rail itself.

The projection on the nut-bearing has either partial threads engagable with the threads of the lead screw or mounts a circular hub which is internally threaded to engage the lead screw.

The reinforcing rail may include at least one flat extending lengthwise which is engagable with a mating flat in the nut to supplement the anti-rotation function of the tongue and the slot in the rail to prevent the nut from rotating relative to the reinforcing rail. The outer surface of the reinforcing rail may be coated with a low-friction material such as PTFE, Nylon or the like. The nut-bearing also may be made of self-lubricating material such as acetyl and may include PTFE carbon fiber additive or other lubricating additives for low frictional engagement with the lead screw. It may be molded around or attached to a ball bushing for added stiffness and lubricity. The sleeve bearing located within the lead screw may be made of Nylon, Dehrin or like plastic material.

A radial compensation device, such as a wedge, is carried by the nut-bearing. The wedge member engages the guide rail and/or an elongated slotted insert within the rail such as the elongated sleeve bearing to limit rotation of the nut-bearing. The wedge member is biased to move radially towards the central axis and the lead screw by a spring. The wedge has angled bearing surfaces which contact the guide rail or elongated sleeve bearing to form a tapered snug engagement with the wedge moving radially inward as wear occurs, thereby restricting radial rotation of the nut-bearing.

The above and other features of the invention including various and novel details of construction and combination of parts will now be more particularly described with reference to the accompanying drawings and pointed out in the claims. It will be understood that the particular reinforced lead screw embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

FIG. 1 is a plan view of a reinforced lead screw embodying the present invention;

FIG. 2 is a partial sectional view taken along the line II—II on FIG. 1;

FIG. 9 is a plan view of an alternative embodiment of the reinforced lead screw with a spring bias wedge in reinforcing rail;

FIG. 10 is a partial sectional view taken along the line X—X on FIG. 9;

FIG. 11 is a sectional view taken along the line XI—XI on FIG. 9; and

FIG. 12 is a perspective view of the reinforced lead screw with a spring bias wedge in reinforcing rail with portions broken away.

DETAILED DESCRIPTION OF THE INVENTION

Figure 3:
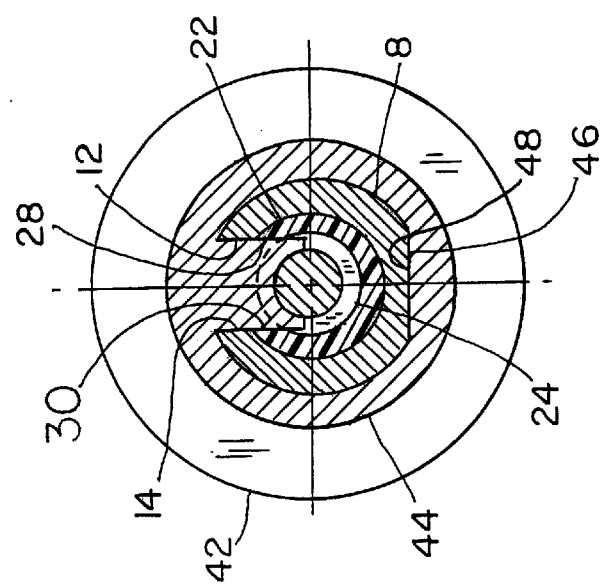
FIG. 3 is a sectional view through the reinforced guide rail and the nut-bearing taken along the line III—III on FIG. 1 with the lead screw and reinforcing rail removed.

The reinforced lead screw is seen assembled in plan view in FIG. 1. It comprises a lead screw 2 rotatable about an axis α and having threads 4 formed along its length. A projection 6 is formed on one end of the lead screw 2 to connect it to a reversible driving motor (not shown) in order to rotate the lead screw 2 alternatively in clockwise and counterclockwise direction.

Surrounding lead screw 2 is an elongated reinforcing rail 8 which extends along the length of the screw. The reinforcing rail is hollow to accommodate the lead screw and includes a slot 10 extending lengthwise and parallel to the central axis α of the lead screw. The slot includes side walls 12 and 14 which may constitute bearing surfaces as will be explained in further detail hereinafter. The lead screw is journaled within the reinforcing rail by bearings 16 and 18 for rotation relative to the reinforcing rail.

With reference to FIG. 2, there will be seen an elongated sleeve bearing 22 extending lengthwise of the reinforcing rail. The bearing is made of a low-friction plastic such as PITE, Nylon or Delrin and has a circular interior and engages the threads 4 of the lead screw. It functions as a radial support for the lead screw preventing the screw from whipping or vibrating as it is rotated.

The sleeve bearing 22 includes a slot 26 having side walls 28 and 30, as seen in FIG. 3 which are essentially continuations of the side walls 12 and 14, respectively, of the slot 10 in the reinforcing rail. The slots 10 and 26 are aligned with each other.

In operation, the reinforcing guide rail 8 would be secured in a machine structure by any convenient means (not shown) with a reversible driving motor attached to the lead screw.

A nut-bearing, generally indicated 40, which may be metal or, preferably, moldable plastic such as acetyl with carbon filter additives is movable in a bilateral direction along the reinforcing rail. The nut-bearing may optionally have anti-backlash properties. The nut-bearing 40 includes a flange 42 which is illustrated as circular but may be constructed in any convenient shape depending on the tool or load to be attached. The nut-bearing 40 includes a body portion 44 and which, as will be seen in FIG. 4, is provided with an optional internal flat 46 which is engagable with an optional mating flat 48 formed on the bottom of the reinforcing rail 8 as seen in FIG. 3.

The element 40 is called a nut-bearing because its functions as both. It functions as a nut because, as will be seen hereinafter, it is internally threaded and is moved by the lead screw. Secondly, it has internal bearing surfaces and slides on the rail.

Figure 5:
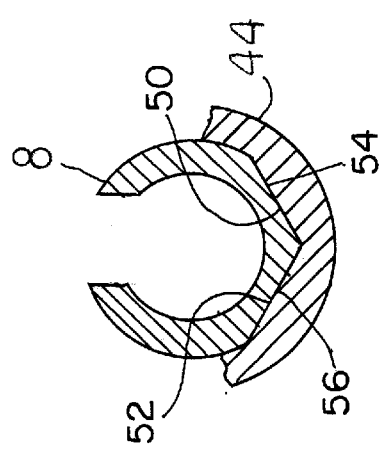
FIG. 5 is a schematic sectional view of part of the guide rail and the nut-bearing illustrating another embodiment of the flats.

As will be seen in FIG. 5, a plurality of flats 50 and 52 (hereinafter illustrated as only 2) are formed on the reinforcing rail 8 which are engagable with mating flats 54 and 56 formed in the body portion 44 on the nut-bearing 40.

Figure 4:
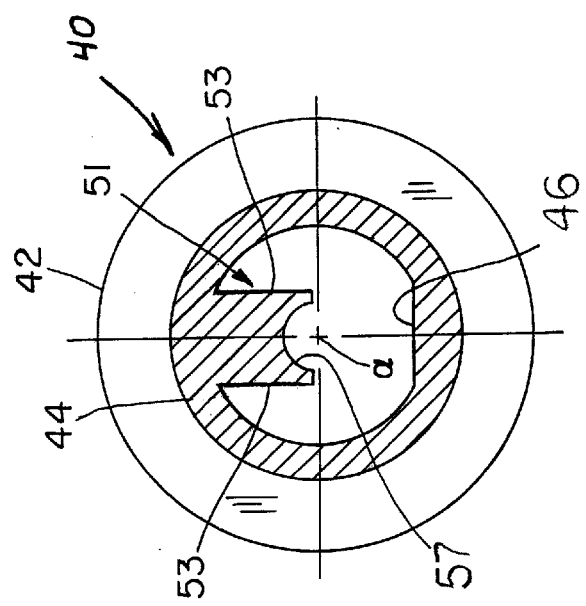
FIG. 4 is a view similar to FIG. 3 with the lead screw and the reinforcing rail removed having a flat on the nut bearing.

As will be seen in FIG. 4, the nut-bearing 40 includes a projecting portion or tongue 51 extending radially inwardly. It has parallel sides 53 which are engagable with the sides of the aligned slots 10 and 26 formed in the guide rail 8 and the bearing 22 respectively designated 12, 14, 28 and 30. This engagement also assures that, in addition to the flats 46 and 48, the nut will not rotate relative to the guide rail when the lead screw is rotated.

The purpose of the optional flats 46, 48, 50, 52, 54, and 56, be there one or a plurality, is to supplement the auto-rotational function of the tongue 51 and the slots 10 and 26 in preventing the nut-bearings 40 from rotating relative to the reinforcing rail 8 when the lead screw 2 is rotated. This could be the case where the frictional engagement between the threads of the lead screw and the nut is greater than the frictional engagement between the nut and the exterior of the guide rail.

Referring to FIG. 3, threads are formed in an arcuate portion 57 at the innermost end of the projection 51. The threads are engagable with the threads 4 of the lead screw 2 such that when the lead screw is rotated, either clockwise or counterclockwise, the nut-bearing 40 will translate relative to the reinforcing rail 8.

Figure 6:
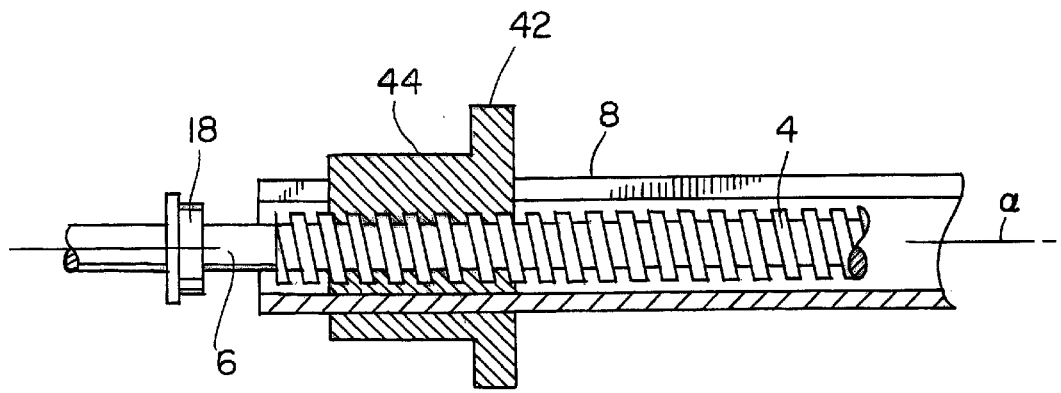
FIG. 6 is a sectional view similar to FIG. 2 with the sleeve bearing removed.
Figure 7:
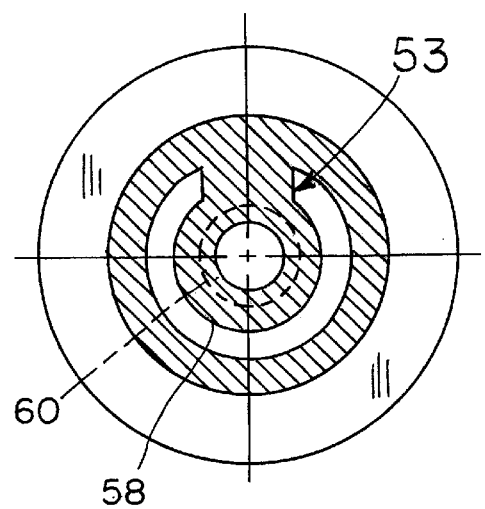
FIGS. 7 and 8 are views similar to FIGS. 3 and 4, respectively, of an alternative construction of the nut-bearing.
Figure 8:
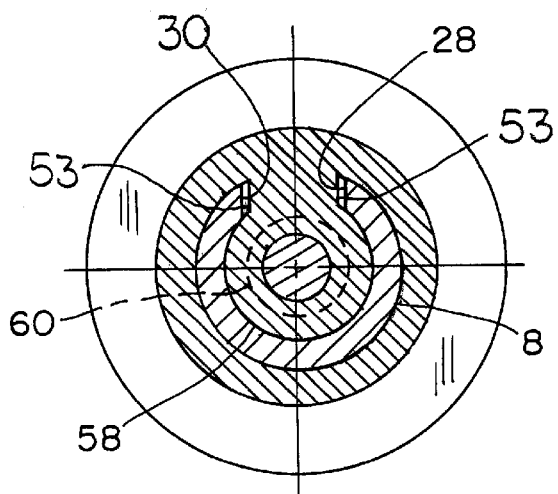

An alternative construction of the nut-bearing 40 is shown in FIGS. 7 and 8. A circular hub portion 58 is formed on the torque or projection 51 and it has internal threads 60, as seen in FIG. 6, which encircle and engage the threads 4 of the lead screw 2. In FIG. 8, the sides 28 and 30 of the slot of the reinforcing rail 8 are shown separated from the sides 53 of the projection 51. This is optional construction. The internal threads 60 of the hub 58 are in mating engagement with the threads of the lead screw.

Functionally, the FIG. 7 embodiment of the nut operates in the same manner as the FIG. 3 embodiment.

FIG. 6 is a view similar to FIG. 2 with the sleeve bearing 22 removed. If a high degree of flexure of the lead screw were anticipated, this would not be done or, conversely, the reinforcing rail 8 would be constructed with a smaller diameter such that it could engage the crests of the threads formed on the lead screw. Furthermore, the longer the lead screw is, the more need there is for the reinforcing bearing to support the lead screw against whipping.

With the present invention, there is no need for lateral guide rails for the nut, or if a carriage is attached, to ride on, since the reinforcing rail 8 is generally sufficient except in very large tool requirements. Since the breadth of the single rail construction is smaller, there is less chance for canting or skewing of the nut because its load can be mounted closer to the axis α. Circular loads can also be attached to the nut 44 surrounding the reinforced lead screw where there would be little or no torque applied to the nut to cause it to bind on the guide rail 8.

The surfaces 12 and 14 on the guide rail 8, as well as the surfaces 28 and 30 on the sleeve bearing 22 (if one is used, as in FIG. 3), are subject to wear. Likewise, the surfaces 46, 48 and 50, 52, 54, and 56 are subject to wear. The unwanted wear will permit the nut bearing 40 to rotate slightly on the guide rail 8 as well as to move radially relative to the axis α. An alternative embodiment of the reinforced lead screw having a radial compensation device to counteract for wear is shown in FIGS. 9–12.

In a preferred embodiment the radial compensation device is a wedge member, generally indicated 70. The wedge 70 is slidably mounted in the flange portion 42 of the nut bearing 40 compensating for this wear. It has angled bearing surfaces 72 which engage angled surfaces 10' and 12' formed on the guide rail 8. As seen best in FIGS. 11 and 12, the surfaces 10' and 12' in the guide rail 8 converge toward the central axis α in a generally V-shaped configuration forming an including angle β which is from about 30°–60°. The beveled sides 72 are constructed on the same angle β such that the wedge member 70 will ride along the bearing surfaces 72.

The wedge member 70, is generally rectangular in overall configuration, having a planar surface 74 as part of a rectangular portion 76 which is fitted into a mating opening in the flange portion 42 of the nut. The planar surface 74 becomes flush with the surface 78 of the flange 42 as will be seen in FIG. 9. The member 76 and the mating opening have parallel sides 80 best seen in FIG. 11 to permit the wedge 70 to slide radially in the nut 40.

A spring 82 is received in a recess 84 in an interior floor 86 of the wedge member 70. The upper portion of the spring 82 is bearing against a ceiling 88 formed in the flange 42. The spring continuously urges the member 70 radially inwardly toward the axis α to continuously urge the bearing surfaces 72 against the mating surfaces 12', 14' of the guide rail 8 to restrict radial motion of the nut-bearing 40. A finger 90, ascending upwardly from the floor 86, engages behind a notch 92 in the ceiling 88 to retain the member 70 within the nut.

What is claimed is:

1. A reinforced lead screw assembly comprising:
   a threaded lead screw rotatable about a central axis;
   a hollow elongated reinforcing rail extending lengthwise along and surrounding the lead screw;
   a slot in the reinforcing rail extending the length of the central axis;
   tapered bearing surfaces forming the sides of the slot;
   a nut-bearing moveable axially along the reinforcing rail;
   a radial compensation device slidably mounted on the nut-bearing and having a bias means for movement toward the central axis;
   a projection on the nut extending through the aligned slots and engagable with the bearing surfaces; and
   threads on the nut-bearing engageable with the threads on the lead screw for moving the nut-bearing in reciprocating motion lengthwise along the rail when the lead screw is rotated.

2. A reinforced lead screw assembly according to claim 1 wherein the radial compensation device is a wedge.

3. A reinforced lead screw assembly according to claim 2 wherein the bias means is a spring.

4. A reinforced lead screw assembly according to claim 3 wherein the bearing surface on the wedge is on an angle of between 30°–60° relative to the central axis.

5. A reinforced lead screw assembly according to claim 3, comprising at least one flat extending lengthwise along the reinforcing rail and at least one mating flat in the nut-bearing to prevent the nut-bearing from rotating relative to the reinforcing rail.

6. A reinforced lead screw assembly according to claim 3, having a plurality of flats extending lengthwise along the reinforcing rail and mating flats in the nut-bearing to prevent the nut-bearing from rotating relative to the reinforcing rail.

7. A reinforced lead screw assembly according to claim 3, wherein the projection mounts a circular hub which has internal threads engagable with the threads of the lead screw.

8. A reinforced lead screw assembly according to claim 3 wherein the wedge has a retaining mechanism to retain the wedge in the nut-bearing.

9. A reinforced lead screw assembly comprising:
   a threaded lead screw rotatable about a central axis;
   a hollow, elongated reinforcing rail extending the length of and surrounding the lead screw, the reinforcing rail having a slot extending lengthwise parallel to the central axis and forming a pair of side walls;
   a nut-bearing moveable axially along the reinforcing rail;
   a wedge slidably mounted on the nut-bearing for movement toward the central axis and engageable with the side walls of the reinforcing rail;
   a portion of the nut-bearing extending through the slot; and
   internal threads on the extending portion of the nut-bearing engageable with the threads on the lead screw for moving the nut-bearing in reciprocating motion along the length of the rail when the lead screw is rotated.

10. A reinforced lead screw assembly according to claim 9 wherein the wedge has a pair of angled bearing surface for engaging side walls of the reinforcing rail.

11. A reinforced lead screw assembly according to claim 10, having at least one flat extending the length of the reinforcing rail and a mating flat in the nut-bearing to prevent the nut from rotating relative to the reinforcing rail.

12. A reinforced lead screw assembly according to claim 10, having a plurality of flats extending the length of the reinforcing rail and mating flats in the nut-bearing to prevent the nut from rotating relative to the reinforcing rail.

13. A reinforced lead screw assembly according to claim 10, wherein the portion of the nut-bearing extending through the slot mounts a circular hub which has internal threads engagable with the threads of the lead screw.

14. A reinforced lead screw assembly comprising:
   a threaded lead screw rotatable about a central axis;
   a hollow elongated reinforcing rail extending the length of and surrounding the lead screw;
   the reinforcing rail having a slot extending the length of the central axis and forming a pair of tapered bearing side walls;
   a nut-bearing moveable axially along the reinforcing rail;
   a wedge slidably mounted on the nut-bearing for movement toward the central axis and having a pair of angled bearing surfaces engageable with the side walls of the reinforcing rail;
   a spring for biasing the wedge towards the central axis;
   a portion of the nut-bearing extending through the slot; and internal threads in the extending portion of the nut-bearing engageable with the threads on the lead screw for moving the nut in reciprocating motion along the length of the rail when the lead screw is rotated.

15. A reinforced lead screw assembly according to claim 14, wherein the nut-bearing threads are formed on the portion of the nut extending through the slots in an arc.

16. A reinforced lead screw assembly according to claim 14, wherein the portion of the nut-bearing extending through the slots mounts a circular hub which has internal threads engagable with the threads of the lead screw.

17. A reinforced lead screw assembly of claim 14 further comprising an elongate bearing within the reinforcing rail having a slot aligned with the slot in the reinforcing rail and forming a pair of side walls of the elongated bearing.

18. A reinforced lead screw assembly according to claim 17 further comprising at least one flat extending the length of the reinforcing rail and at least one mating flat in the nut-bearing to prevent the nut from rotating relative to the reinforcing rail.

19. A reinforced lead screw assembly according to claim 17, wherein the sleeve-bearing has an arcuate interior engageable with the threads of the lead screw.

20. A reinforced lead screw assembly according to claim 17, wherein the sleeve-bearing is made of a low friction plastic material.

* * * * *